United States Patent [19]
Oda et al.

[11] Patent Number: 4,908,256
[45] Date of Patent: Mar. 13, 1990

[54] CERAMIC-METAL COMPOSITE BODIES

[75] Inventors: Isao Oda; Takao Soma, both of Nagoya, Japan

[73] Assignee: NGK Insulators, Ltd., Nagoya, Japan

[21] Appl. No.: 54,810

[22] Filed: May 27, 1987

[30] Foreign Application Priority Data

Jun. 9, 1986 [JP] Japan ................. 61-131919

[51] Int. Cl.$^4$ ................. B32B 3/16
[52] U.S. Cl. ................. 428/133; 428/472; 428/698
[58] Field of Search ............ 428/133, 136, 137, 469, 428/472, 698, 699

[56] References Cited

U.S. PATENT DOCUMENTS

| | | |
|---|---|---|
| 2,297,508 | 9/1942 | Schutte . |
| 3,604,819 | 9/1971 | Krahe . |
| 3,666,302 | 5/1972 | Kellett . |
| 3,922,444 | 11/1975 | Nakamura ................. 428/698 X |
| 3,930,071 | 12/1975 | Rao et al. ................. 428/698 X |
| 3,953,636 | 4/1976 | Kirchner ................. 428/698 X |
| 4,256,441 | 3/1981 | Arora . |
| 4,281,941 | 8/1981 | Rottenkolber . |
| 4,424,003 | 1/1984 | Brobeck . |
| 4,486,147 | 12/1984 | Byrne et al. . |
| 4,511,612 | 4/1985 | Hüther et al. ................. 428/698 X |
| 4,585,396 | 4/1986 | Kawamura et al. . |
| 4,614,453 | 9/1986 | Tsuno et al. . |

FOREIGN PATENT DOCUMENTS

| | | |
|---|---|---|
| 0095540 | 12/1983 | European Pat. Off. . |
| 0184457 | 6/1985 | European Pat. Off. . |
| 0161081 | 11/1985 | European Pat. Off. . |
| 2734747 | 2/1979 | Fed. Rep. of Germany . |
| 502133 | 4/1976 | U.S.S.R. . |

OTHER PUBLICATIONS

687 M.T.Z. Motortechnische Zeitschrift, vol. 44 (1983) Jun., No. 6, Schwabisch Gmund, Deutschland.
Machinery's Handbook, 20th Ed., 1978, p. 1554.

Primary Examiner—Nancy A. B. Swisher
Attorney, Agent, or Firm—Arnold, White & Durkee

[57] ABSTRACT

Ceramic-metal composite bodies are disclosed, which are each formed by joining a projection on a ceramic member to a recess or a through hole formed in a metallic member together. A groove portion is provided substantially all around the outer periphery of the metallic member such that a fitting end of the metallic member is located in a position corresponding to the groove portion. A difference between a diameter of a bottom of the groove portion and an outer diameter of the projection of the ceramic member is 0.05 to 0.8 times as large as a difference between an outer diameter of the metallic member and the outer diameter of the projection of the ceramic member.

10 Claims, 6 Drawing Sheets

FIG_2a
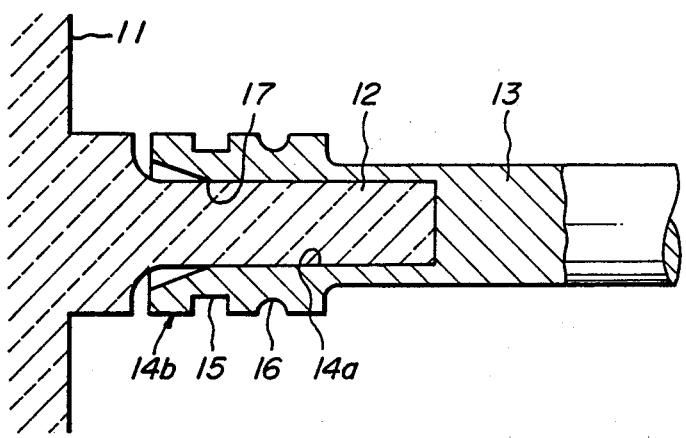
FIG_2b
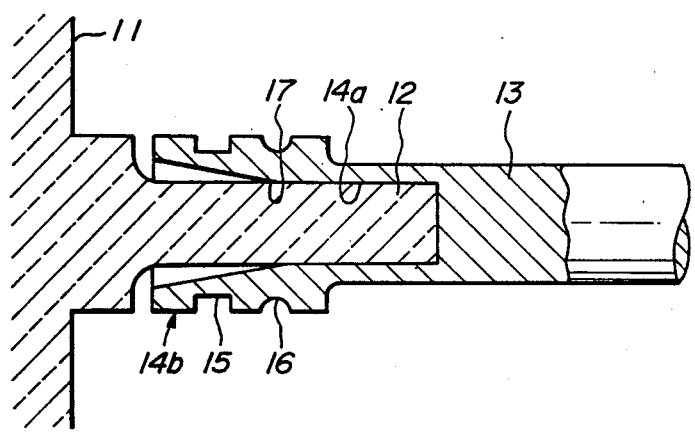

FIG_3
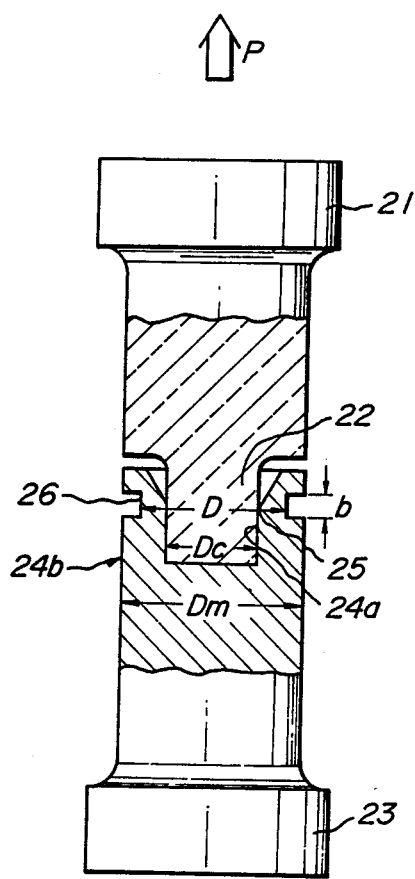

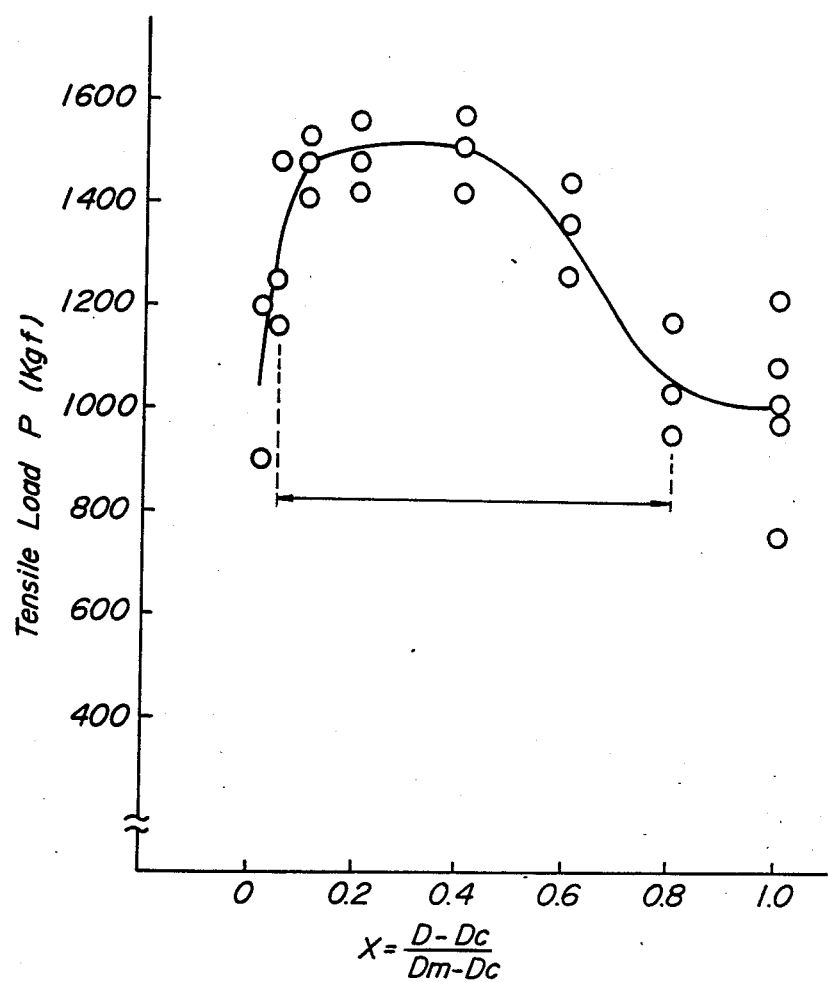
FIG_4

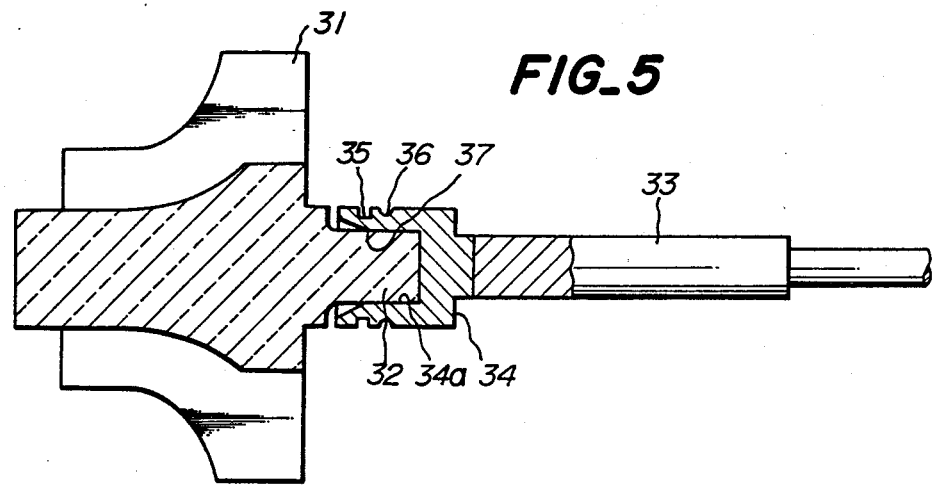
FIG_5
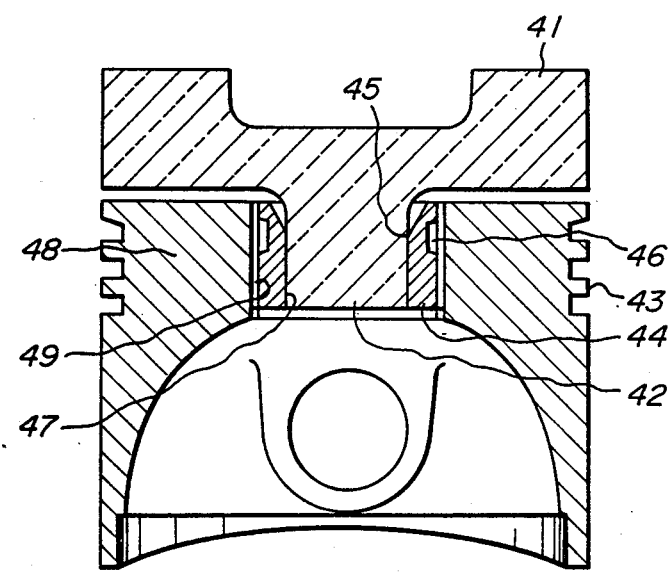
FIG_6

FIG_7
PRIOR ART
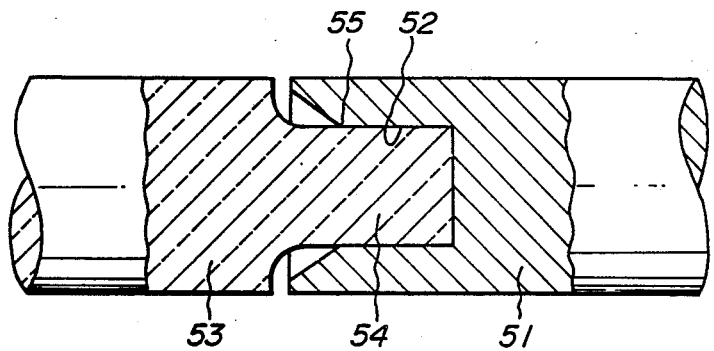

CERAMIC-METAL COMPOSITE BODIES

Background of the Invention (1) Field of the Invention

The present invention relates to ceramic-metal composite bodies.

(2) Related Art Statement

In ceramic-metal composite bodies as shown partially in section in FIG. 7, it has been a common practice that a recess 52 is formed at a joint end face of a metallic member 51 and a projection 54 of a ceramic member 53 to be joined to the metallic member is fitted into the recess 52 to join the ceramic and metallic members together.

In the conventional ceramic-metal composite bodies having the above-mentioned construction, a large stress concentration occurs in the ceramic member at a fitting end due to a compression force for the fitting when the ceramic member is fitted into the metallic member. As a result, the ceramic-metal composite bodies are weak against bending or twisting so that the composite bodies are liable to be broken. Thus, there is a problem that the ceramic-metal composite bodies having high reliability cannot be obtained.

SUMMARY OF THE INVENTION

It is therefore an object of the present invention to solve the above-mentioned problems and to provide high reliability ceramic-metal composite bodies in which a stress concentration upon a ceramic member when joined to a metallic member is low to make the ceramic-metal composite bodies less liable to be broken.

According to the present invention, there is a provision of ceramic-metal composite bodies comprising a ceramic member and a metallic member, the ceramic member and the metallic member being joined together by fitting a projection formed on the ceramic member into a recess or a through hole formed in the metallic member, wherein a groove portion is provided substantially all around the outer periphery of the metallic member, a fitting end of the metallic member is located on the inside of the recess or the through hole of the metallic member in a position corresponding to the groove portion, and a difference between a diameter of a bottom of the groove portion and the outer diameter of the projection of the ceramic member is 0.05 to 0.8 times as large as a difference between an outer diameter of the metallic member and the outer diameter of the projection of the ceramic member.

According to the ceramic-metal composite bodies thus constructed, since the groove portion is provided substantially entirely around the outer periphery of the metallic member and the fitting end is located at a position corresponding to the groove portion while the difference between the outer diameter of the bottom of the groove portion and the outer diameter of the ceramic member is 0.05 to 0.8 times as large as the difference between the outer diameter of the metallic member and the outer diameter of the projection of the ceramic member, a stress concentrated upon the ceramic member at the fitting end is mitigated so that high reliability ceramic-metal composite bodies which are resistant to being broken against bending or twisting can be obtained.

These and other objects, features and advantages of the invention will be appreciated upon reading of the following description of the invention when taken in connection with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein:

FIG. 1, FIG. 2(a) and FIG. 2(b) are partial sectional views schematically illustrating the ceramic-metal metal composite bodies according to the present invention;

FIG. 3 is a partial sectional view of an embodiment of the ceramic-metal composite body according to the present invention;

FIG. 4 is a graph showing the relationship between a tensile load and a depth of a groove portion in the embodiment shown in FIG. 3;

FIG. 5 is a partial sectional view illustrating an example of a ceramic turbocharger rotor embodying the present invention;

FIG. 6 is a partial sectional view of an example of an engine piston embodying the present invention; and FIG. 7 is a partial sectional view of an example of a conventional ceramic-metal composite body.

DETAILED DESCRIPTION OF THE INVENTION

Figure 1:
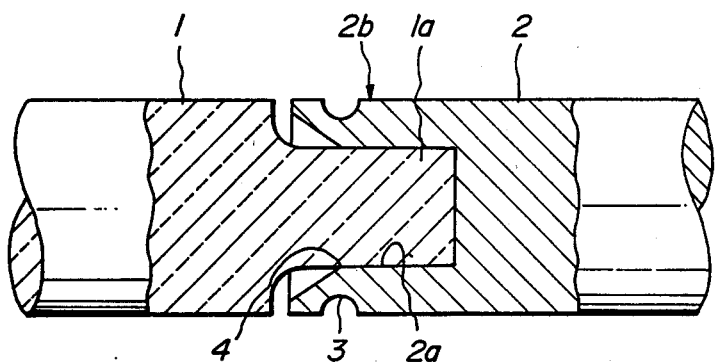

The present invention will be explained in more detail with reference to the attached drawings below.

In FIG. 1 is shown a partial sectional view illustrating the ceramic-metal composite body according to the present invention. In FIG. 1, a projection 1a is provided at an end portion of a ceramic member 1. This projection 1a is fitted into a recess 2a formed at one end of a metallic member 2 through press fitting, etc. A groove portion 3 is provided entirely around the outer periphery of a recessed portion 2b of the metallic member 2, and a fitting end 4 is provided at the inner periphery of the recess 2a of the metallic member 2 at a position corresponding to the groove portion 3. Although the shape of the groove portion 3 is semicircular, in section in the embodiment of FIG. 1, this shape is not restrictive. A groove portion having any shape may be employed so long as it essentially functions as a groove.

FIG. 1 shows an example of a shaft structure in which the outer diameter of the ceramic member 1 is equal to that of the metallic member 2, but the present invention is not limited to embodiments in which the outer diameter of the shaft is uniform.

FIGS. 2(a) and 2(b) are partial sectional views illustrating embodiments in which the ceramic-metal composite body according to the present invention is applied to a composite body such as a ceramic turbocharger rotor or a ceramic gas turbine rotor which is provided with a seal ring groove and/or an oil slinger groove all around the outer periphery of a recessed portion of a metallic member from the constructual necessity. In FIGS. 2(a) and 2(b), a projection 12 is provided on a ceramic rotor 11, and the projection 12 is fitted into a recess 14a formed in a metallic member 13 through press fitting, shrinkage fitting, expansion fitting, combinations, thereof or the like. A seal ring groove 15 and an oil slinger groove 16 are formed all around the outer periphery of the recessed portion 14b of the metallic member 13 such that in FIG. 2(a), a fitting end 17 is positioned at a location corresponding to the seal ring groove 15 and in FIG. 2(b), a fitting end 17 is positioned at a location corresponding to the oil slinger groove 16. Accordingly, when the present invention is to be applied to composite bodies such as ceramic turbocharger rotors and ceramic gas turbine rotors in which a seal ring groove and/or an oil slinger groove is provided around the outer periphery of the recessed portion of the metallic member from the constructual necessity, the seal ring or the oil slinger groove can be used as a groove portion in the present invention. Therefore, the object of the present invention can be advantageously attained by a simple structure.

Next, specific embodiments of the present invention will be explained. These embodiments are merely given in illustration of the present invention, but should never be interpreted to limit the scope thereof.

EXAMPLE 1

A ceramic-metal composite body having a shape shown partially in section in FIG. 3 was prepared by joining a projection 22 of a ceramic member 21 made of $Si_3N_4$ to a recess 24a of a metallic member 23 made of nickel-chrome-molybdenum steel (JIS-SNCM439). In the illustrated embodiment, the joining was performed by press fitting. The press fitting was carried out after the outer diameter $D_c$ of the projection 22 of the ceramic member 21 and the inner diameter $d_m$ of the recess 24a of the metallic member 23 were processed to be 13 mm and 12.9 mm, respectively. After the press fitting, the metallic member was finished to have the outer diameter $D_m$ of 18 mm at the recessed portion 24b and then a rectangular section groove portion 26 of a width b=2.5 mm was formed all around the outer periphery of the recessed portion 24b of the metallic member at a location corresponding to the fitting end 25.

In order to examine the influence of the depth of the groove portion 26, samples having varied values of D being the diameter of the bottom of the groove portion 26 were prepared, and a tensile test was carried out at room temperature. Results are shown in Table 1 and FIG. 4. In Table 1 and FIG. 4, a tensile load is a load P under which the ceramic member 21 was broken from the fitting end 25. The influence of the depth of the groove portion 26 was evaluated based on X which is defined in the following equation (1):

$$X = \frac{D - D_c}{D_m - D_c} \quad (1)$$

Thus, X=1.0 corresponds to a case where no groove portion 26 is provided around the outer periphery of the recessed portion 24b of the metallic member.

TABLE 1

| X | Tensile load (kgf) | Average value (kgf) |
| --- | --- | --- |
| 0.03 | 1200 | 1050 |
|  | 900 |  |
| 0.05 | 1480 | 1300 |
|  | 1250 |  |
|  | 1160 |  |
| 0.1 | 1530 | 1470 |
|  | 1480 |  |
|  | 1410 |  |
| 0.2 | 1560 | 1490 |

TABLE 1-continued

| X | Tensile load (kgf) | Average value (kgf) |
| --- | --- | --- |
|  | 1480 |  |
|  | 1420 |  |
| 0.4 | 1570 | 1500 |
|  | 1510 |  |
|  | 1420 |  |
| 0.6 | 1440 | 1350 |
|  | 1360 |  |
|  | 1260 |  |
| 0.8 | 1170 | 1150 |
|  | 1030 |  |
|  | 950 |  |
| 1.0 | 1210 | 1000 |
|  | 970 |  |
|  | 750 |  |
|  | 1080 |  |
|  | 1010 |  |

As evident from Table 1 and FIG. 4, the tensile strength was larger when X=0.05 to 0.8 corresponding to the cases where the groove portion 26 is provided at a location corresponding to the fitting end 25 according to the present invention, as compared with the conventional case corresponding to X=1.0 in which no groove portion was provided.

EXAMPLE 2

A ceramic turbocharger rotor having a shape shown partially in section in FIG. 5 was prepared by joining a projection 32 of a ceramic rotor 31 made of $Si_3N_4$ to a recess 34a of a cup-like metallic member 34 made of an Fe-Ni alloy which was joined to one end of a metallic shaft 33 made of nickel-chrome-molybdenum steel (JIS-SNCM439) through a friction welding. In this embodiment, the projection 32 (13 mm in outer diameter) of the ceramic rotor 31 was fitted, through press fitting, into a recess 34a of the low expansion cup-like metallic member 34 having an inner diameter of 12.9 mm and an outer diameter of 18 mm before the press fitting. A seal ring groove 35 and an oil slinger groove 36 were formed all around the outer periphery of the metallic member 34 such that a fitting end may be positioned at a location corresponding to the seal ring groove 35 and a diameter of the bottom of the seal ring groove 35 may be 15 mm. The hardness of the metallic shaft 33 made of nickel-chrome-molybdenum steel (JIS-SNCM439) was adjusted by induction hardening and tempering treatment.

Although the thus obtained ceramic turbocharger rotor was assembled into a high temperature rotation tester and was subjected to a rotation test at a number of revolutions of 150,000 rpm for 50 hours by using a combustion gas of 800° C., no abnormality was observed. When the same test was performed with respect to a ceramic turbocharger rotor in which the fitting end 37 was not provided at a location corresponding to a seal ring groove 35 and an oil slinger groove 36, the ceramic member was broken from the fitting end 37 in 38 hours.

EXAMPLE 3

FIG. 6 is a partial sectional view illustrating an embodiment in which the present invention is applied to a piston. A piston cap 41 having a cylindrical projection 42 of an outer diameter of 20 mm and a length of 20 mm was prepared from $Si_3N_4$. In the meanwhile, a metallic member 44 having an outer diameter of 30 mm, an inner diameter of 19.7 mm and an entire length of 15 mm was prepared from stainless steel. Then, the cylindrical projection 42 of the piston cap 41 was press fitted into a through hole 47 of the metallic member 44 while both the members were maintained at 500° C. Thereby, a ceramic-metal composite body having a trapezoidal section groove portion 46 of a diameter of 25 mm formed all around the outer periphery of the metallic member 44 corresponding to a fitting end 45 was prepared.

On the other hand, a recess 49 into which the ceramic-metal composite body thus obtained was to be inserted was formed in a crown portion 48 of a piston body 43 made of a spheroidal graphite cast iron having an outer diameter of 70 mm. Then, a male screw thread provided at the outer periphery of the metallic member 44 of the ceramic-metal composite body was screwed to a female screw thread formed in the recess 49 to obtain a heat insulating engine piston having a shape shown partially in section in FIG. 6. Even when the thus obtained piston was tested in a diesel engine having a cylinder bore of 70 mm and a stroke of 75 mm at an engine speed of 2200 rpm for 100 hours, no abnormality was observed. When the same test was performed with respect to a piston in which no groove portion was provided around the outer periphery of a metallic member 44 at a location corresponding to the fitting end 45, the ceramic was broken from the fitting end 45 in 87 hours.

The present invention is not limited to the above-mentioned embodiments, but various modifications and variations may be made. For instance, in the above embodiments, $Si_3N_4$ was used as the ceramic material, but the present invention is not limited thereto. Silicon carbide, sialon, zirconia, mullite, alumina, beryllia, etc. may be used. Further, the metallic member is not limited to the above-mentioned materials, but needless to say, other metallic materials can be used.

As evident from the aforementioned, according to the ceramic-metal composite bodies of the present invention, the fitting end is provided at a location corresponding to the groove portion formed substantially all around the outer periphery of the metallic member, and the difference between the diameter of the bottom of the groove portion and the outer diameter of the projection of the ceramic member is 0.05 to 0.8 times as large as the difference between the outer diameter of the metallic member and the outer diameter of the projection of the ceramic member, so that the stress concentration upon the ceramic member at the fitting end is mitigated to give ceramic-metal composite bodies having high reliability.

What is claimed is:

1. A ceramic-metal composite body comprising:
   a ceramic member including a ceramic projection formed thereon;
   a metallic member including a recess or through hole formed in one end thereof, said ceramic member and said metallic member being joined together only at a single, continuous contact surface between said members, said ceramic protrusion being fitted into said metallic recess or through hole, said contact surface having a fitting end defined by the beginning of said contact surface proximate said one end of said metallic member; and
   a circumferential groove in the outer periphery of said metallic member located substantially in a plane normal to the axis of said metallic member, and extending substantially completely around said metallic member, a center line of said groove and said fitting end being located substantially an equal distance from said one end of said metallic member.

2. A ceramic-metal composite body according to claim 1, wherein the projection of the ceramic member is fitted into the recess or through hole of the metallic member through a process selected from the group consisting of press fitting, shrinkage fitting, expansion fitting and combinations thereof.

3. A ceramic-metal composite body according to claim 1, wherein said body is a rotary shaft for a mechanical part selected from a turbocharger and a gas turbine rotor.

4. A ceramic-metal composite body according to claim 1, wherein the groove is selected from a seal ring groove and an oil slinger groove in a rotary shaft for a mechanical part selected from a turbocharger and a gas turbine rotor.

5. A ceramic-metal composite body according to claim 1, wherein said body comprises a joint portion between a ceramic piston cap and a metallic piston body.

6. A ceramic-metal composite body comprising:
   a ceramic member including a ceramic projection formed thereon;
   a metallic member including a recess or through hole formed in one end thereof, said ceramic member and said metallic member being joined together only at a single, continuous contact surface between said members, said ceramic protrusion being fitted into said metallic recess or through hole, said contact surface having a fitting end defined by the beginning of said contact surface proximate said one end of said metallic member; and
   a circumferential groove in the outer periphery of said metallic member located substantially in a plane normal to the axis of said metallic member, and extending substantially completely around said metallic member, a center line of said groove and said fitting end being located substantially an equal distance from said one end of said metallic member;
   wherein a difference between a diameter of a bottom of said groove and an outer diameter of said projection is 0.05 to 0.8 times as larger as a difference between an outer diameter of said metallic member and said outer diameter of said projection.

7. A ceramic-metal composite body according to claim 6, wherein the projection of the ceramic member is fitted into the recess or through hole of the metallic member through a process selected from the group consisting of press fitting, shrinkage fitting, expansion fitting and combinations thereof.

8. A ceramic-metal composite body according to claim 6, wherein said body is rotary shaft for a mechanical part selected from a turbocharger and a gas turbine rotor.

9. A ceramic-metal composite body according to claim 6, wherein the groove is selected from a seal ring groove and an oil slinger groove in a rotary shaft for a mechanical part selected from a turbocharger and a gas turbine rotor.

10. A ceramic-metal composite body according to claim 6, wherein said body comprises a joint portion between a ceramic piston cap and a metallic piston body.

* * * * *